United States Patent [19]
Malenotti

[11] 4,456,090
[45] Jun. 26, 1984

[54] DEVICE FOR THE ADJUSTMENT OF THE AXIS OF THE FOOTREST IN MOTORCYCLES

[75] Inventor: Franco Malenotti, Rome, Italy

[73] Assignee: Moto Laverda S.p.A., Venezia, Italy

[21] Appl. No.: 386,290

[22] Filed: Jun. 8, 1982

[30] Foreign Application Priority Data
Jun. 11, 1981 [IT] Italy ............................... 85578 A/81

[51] Int. Cl.³ ............................................. B62J 25/00
[52] U.S. Cl. .................................... 180/219; 74/564; 280/291
[58] Field of Search ................. 280/291, 165; 296/75; 180/219; 74/564, 531, 512; 403/3, 4, 84, 373; 248/274

[56] References Cited
U.S. PATENT DOCUMENTS
1,261,442  4/1918  Rigby ................................. 280/291
FOREIGN PATENT DOCUMENTS
296494  9/1928  United Kingdom ............... 280/291

Primary Examiner—David M. Mitchell
Assistant Examiner—D. Lynn Fugate
Attorney, Agent, or Firm—Bucknam and Archer

[57] ABSTRACT

A device for the adjustment of the axis of the footrest in motorcycles is described, which device comprises a pair of movable discs (2,2'). The position of the discs is fixed with respect to plate (3) fixed in the frame of the motorcycle, after the position of the footrest is adjusted within the scope of a circumference which has as center the center of the discs and as radius, the eccentricity of the footrest (1) with respect to the same center, as shown in FIG. 1.

2 Claims, 3 Drawing Figures

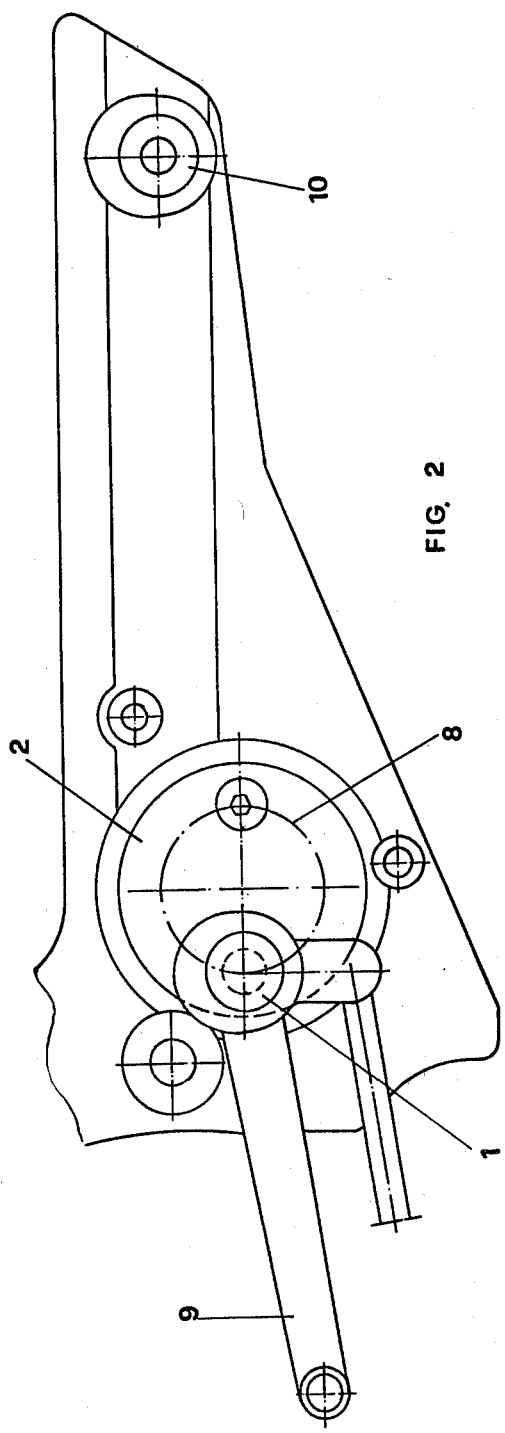
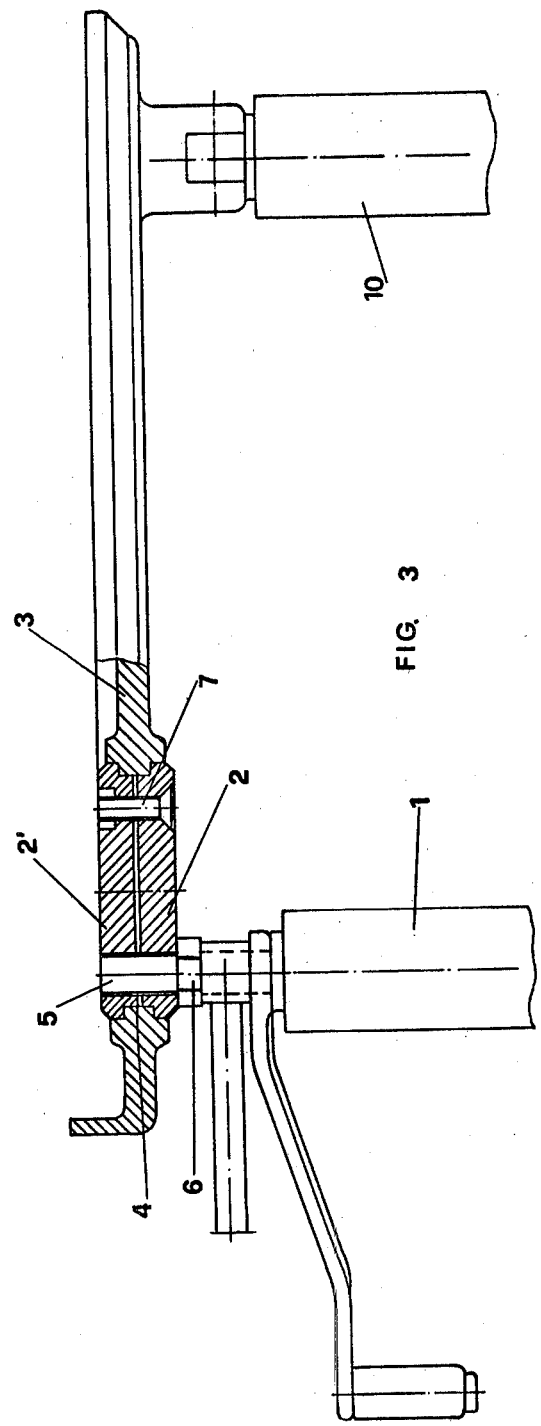

DEVICE FOR THE ADJUSTMENT OF THE AXIS OF THE FOOTREST IN MOTORCYCLES

The present invention relates to motorcycles and more specifically to a device for the adjustment of the axis of the footrest in motorcycles for the purpose of permitting within certain limits a positioning of the footrest which is most suitable for the person who is using the motorcycle.

It is well known that one of the difficulties for a motorcyclist, particularly when using the motorcycle in sports in motion, resides in adapting himself with the position of the foot to the fixed position in general of the foortrest which is pre-arranged on the motorcycle. In view of the fact that the latter in general cannot be changed, the motorcyclist is obliged to modify its axis on the motorcycle on the basis of the position of the footrest in relation to his physical size. Other drawbacks occur when the motorcyclist foresees that he will have to overcome during his travel curves of limited radius which oblige him to lean strongly on one of the sides with the possibility of sliding with the end of the footrest on the ground, a fact which may cause inevitably sideskidding and occasionally even a fall.

One object of the present invention is to provide a device which permits to adjust the position of the footrest on the motorcycle for the purpose of adapting the footrest to the physical size of the individual.

Another object of the present invention is to provide a device which is capable of adjusting the position of the footrest in relation to the type of travel with a simple maneuver without particular devices except a simple screwdriver and a key.

The crux of the present invention resides in the fact that each footrest is mounted on a disc movable with respect to the frame so that it is possible to adjust the position of the footrest on the basis of the particular requirements within the limits of a pre-established circumference. After the optimum position of the footrest has been established, the footrest is fixed by means of a simple maneuver of a screw and a small nut in the new position. Obviously, both the pedal which actuates the change in speed on one side as well as the pedal which actuates the brake on the other side, follow the displacements of the footrest without any particular drawback in the view of the adaptability of the means of transmission to the brake and to the change. The invention will now be described in more detail hereinafter by reference to the accompanying drawings of which:

FIG. 2 represents the same adjustment device on an enlarged scale on a side view;

FIG. 3 illustrates the same adjustment device in a planar view which is partially in cross section.

Figure 1:
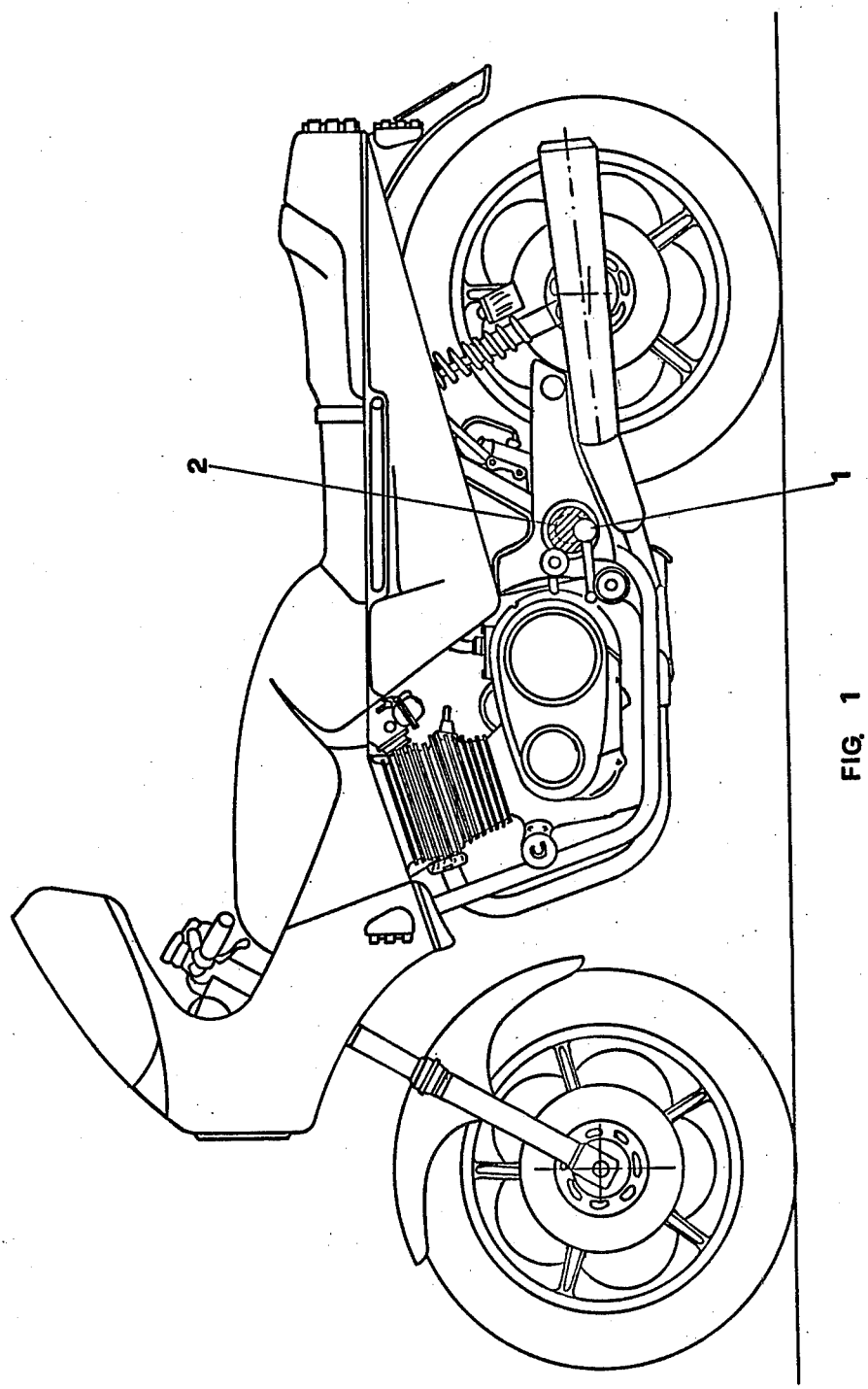
FIG. 1 is an overall side view of a motorcycle provided with the device of adjustment according to the present invention.

As it is clearly shown in FIG. 1, the footrest 1 is mounted on disc 2 with a certain eccentricity with respect to the center of the same disc.

Disc 2 may be displaced rotating on its center within the support plate so that the footrest may assume any possible position within the scope of a circumference having as its center the center of disc 2 and as a radius the eccentricity of the footrest with respect to the same center.

FIGS. 2 and 3 show in more detail the footrest 1 which is mounted on disc 2, the latter being provided with a counterdisc 2' disposed on the opposite side with respect to plate 3 on which they are movable. The two discs 2 and 2' present a border which has an "L" shape with opposite reciprocal orientation so as to close between them the circular projection 4. The latter remains blocked between the two discs when the screw 5 is closed, the screw being maneuvered by means of the hexagonal nut 6 and by means of the screw 7 which is, for instance a flat head screw. The latter is disposed in a diametrically opposite position. The opening and the blocking of the screws 5 and 7 permit to achieve the adjustment and the fixing of the position of the footrest 1 respectively within the circumference 8 as shown in FIG. 2 which has as its center the center of disc 2 and as the radius the eccentricity of the footrest 1.

Obviously, together with the footrest 1 also the pedal 9 is displaced which on one side controls the rear brake of the motorcycle and on the other side controls the change of velocity of the motorcycle. This is made possible due to the fact that the respective controls are constituted by transmissions easily adaptable to the various positions of the footrest.

The advantages, according to the present invention, are obvious if one considers that with one easy maneuver, it is possible to adjust the position of the footrest, for instance by varying the distance with respect to the fixed pedal 10 of the passenger and also by adjusting the height with respect to the level of the ground. The advantage of raising the level of the footrest 1 with respect to the street level is obvious, for instance when one foresees that he has to travel long curves with narrow radius which at high speed naturally cause the substantial inclination of the motorcycle. In this case, the footrest 1 is raised advantageously to the highest point of the circumference 8. When the motorcycle must be guided by a motorcyclist for sports, it is advantageous to bring the footrest 1 to a substantially closer position with respect to the pedal 10 of the passenger.

Naturally, the details of construction of the device according to the present invention described hereinabove and illustrated in the accompanying drawings have been given by way of example and several forms may be provided within the scope of the present invention which is to be limited only by the appended claims.

What is claimed is:

1. In a motorcycle which comprises a frame, a pedal on each side of said frame, a footrest on each side of said frame in conjunction with the pedal, a device for the adjustment of each footrest which comprises two opposite movable discs, a plate for supporting the discs, the plate being fixed to the frame, the discs being mounted so as to be capable of rotating within a cavity formed in said plate, the discs having an axis of rotation, each footrest being screwed on said discs in a position which is eccentric with respect to the axis of rotation of said discs whereby it is possible to adjust the position of each said footrest within a circumference which has as its center the axis of rotation of the discs and as the radius a segment equal to the eccentricity of the footrest.

2. A device, according to claim 1, characterized by the fact that a screw is mounted on said discs in a position diametrically opposite to the position of the footrest for the purpose of cooperating in the blocking of said two discs so as to fix the position of the footrest.

* * * * *